United States Patent [19]

Parmentier

[11] Patent Number: 5,510,068
[45] Date of Patent: Apr. 23, 1996

[54] TITANIUM/ZIRCONIUM/CERIUM OXIDE GRANULAR PARTICULATES/AGGLOMERATES

[75] Inventor: Francois Parmentier, Lyons, France

[73] Assignee: Rhone-Poulenc Chimie, Courbevoie, France

[21] Appl. No.: 369,267

[22] Filed: Jan. 5, 1995

Related U.S. Application Data

[63] Continuation of Ser. No. 829,546, Feb. 4, 1992, abandoned, which is a continuation of Ser. No. 620,375, Nov. 29, 1990, abandoned, which is a continuation of Ser. No. 277,182, Nov. 29, 1988, abandoned.

[30] Foreign Application Priority Data

Nov. 30, 1987 [FR] France ................... 87 16551

[51] Int. Cl.⁶ ................................................. B29C 67/00
[52] U.S. Cl. ............................... 264/117; 23/313 R
[58] Field of Search ........................ 423/263, 608, 423/609, 610, 592; 501/12, 103, 134, 152; 23/313 R; 264/117; 75/770; 502/8, 349, 350, 302, 304, 439

[56] References Cited

U.S. PATENT DOCUMENTS

| | | | |
|---|---|---|---|
| 2,672,452 | 3/1954 | Wankat | 502/8 |
| 2,672,453 | 3/1954 | Wankat | 502/8 |
| 3,194,758 | 7/1965 | Lissant | 23/313 R |
| 3,668,170 | 6/1972 | Maruta et al. | 156/332 |
| 3,844,811 | 10/1974 | Brynko | 106/447 |
| 3,961,005 | 6/1976 | Sparks | 264/117 |
| 4,213,779 | 7/1980 | Caswell | 264/117 |
| 4,222,981 | 9/1980 | Caswell | 264/117 |
| 4,264,552 | 4/1981 | McMahon et al. | 264/DIG. 51 |
| 4,732,750 | 3/1988 | Olson et al. | 423/610 |
| 4,737,478 | 4/1988 | Rainis | 502/8 |

FOREIGN PATENT DOCUMENTS

| | | | |
|---|---|---|---|
| 0065725 | 4/1985 | Japan | 502/8 |
| 0137827 | 7/1985 | Japan | 423/592 |

*Primary Examiner*—Steven Bos
*Attorney, Agent, or Firm*—Burns, Doane, Swecker & Mathis

[57] ABSTRACT

Porous, granular particulates of titanium, zirconium or cerium oxide, preferably essentially spherical in shape, and having a specific volume of at least 0.1 $cm^3/g$ and an apparent packed density of at least 0.2, are prepared by (a) intimately admixing a suspension or sol of titanium, zirconium or cerium oxide, at least one hydrophobic agent, and at least one organic solvent which is immiscible or only slightly miscible with water, thus producing a liquid phase essentially devoid of oxide values and granular solids based on titanium, zirconium or cerium oxide, (b) separating the liquid phase from the granular solids, and, optionally, (c) washing, drying and calcining the granular solids.

32 Claims, No Drawings

2

TITANIUM/ZIRCONIUM/CERIUM OXIDE GRANULAR PARTICULATES/AGGLOMERATES

This application is a continuation of application Ser. No. 07/829,546, filed Feb. 4, 1992, now abandoned, which is a continuation of application Ser. No. 07/620,375, filed Nov. 29, 1990, now abandoned, which is a continuation of application Ser. No. 07/277,182, filed Nov. 29, 1988, now abandoned.

CROSS-REFERENCE TO COMPANION APPLICATION

My application Ser. No. 277,134, now abandoned, is filed concurrently herewith and assigned to the assignee hereof.

BACKGROUND OF THE INVENTION

1. Field of the Invention

The present invention relates to the production of granules based on titanium, zirconium or cerium oxides and to such granules, per se.

2. Description of the Prior Art

Materials based on the aforementioned metallic oxides are known to this art to be useful for a number of applications.

As best as can be determined, certain of these materials do not exist in the form of granules or pellets. It is known, however, that the powder forms thereof are not satisfactory. Indeed, handling of such powders is difficult, in particular in light of the dust and fines they generate.

As regards the materials which in fact exist in the form of granules or pellets, such materials have to be improved in one or more respects. Thus, this art continues to require less fragile particulates having a higher porosity and having mean grain sizes varying over a wide range. It would also be desirable to provide particulates possessing, for a given grain size, a narrow grain size distribution.

Furthermore, in certain cases the processes for the preparation of such materials in the form of granules or pellets require the use of atomizers.

These devices impose certain conditions on the suspensions to be atomized, particularly relative to their dry solids content, which may not exceed a certain maximum value. They also require considerable maintenance.

The atomizing processes also present the disadvantage of limiting the grain size distribution of the products obtained to a certain range.

SUMMARY OF THE INVENTION

Accordingly, a major object of the present invention is the provision of a simple and improved process for the production of granular particulates based on the inorganic oxides of titanium, zirconium or cerium, which granular particulates exhibit certain novel and improved properties vis-a-vis those products heretofore known to this art.

Briefly, the present invention features the production of granules based on a mineral oxide of the titanium, zirconium or cerium oxide type, and comprising the following stages:

(a) intimately admixing a suspension or sol of such an oxide, at least one hydrophobic agent, and at least one organic solvent which is immiscible or only slightly miscible with water, whereby a liquid phase essentially devoid of such oxide and granular solids based on such oxide are produced;

(b) separating the liquid phase from the granules; and (c) optionally washing, drying and calcining such granules.

This invention also features the granules thus prepared, based on a metallic oxide, which are characterized in that they are porous, have a specific volume of at least $0.1\ cm^3/g$, preferably are essentially spherical in shape, and wherein the metallic oxide comprises a titanium oxide, zirconium oxide or cerium oxide.

DETAILED DESCRIPTION OF THE PREFERRED EMBODIMENTS OF THE INVENTION

More particularly according to the present invention, the subject process entails preparing and intimately admixing a suspension or a sol of an oxide, a hydrophobic agent and an organic solvent. Indeed, it has now surprisingly and unexpectedly been determined that, by carrying out the process under certain specific operating conditions, a particular gain size distribution is realized. These particular operating conditions are described in more detail hereinbelow.

Initial suspension or sol:

The process of the invention utilizes a beginning suspension or sol, generally in an aqueous medium, of an oxide of the above type. This suspension or sol may be formulated by any method.

It will be appreciated that the term "oxide" is used herein in its broadest sense, in particular as it also applies to hydrated oxides or to hydroxides capable of being produced by the exemplary processes given below, with the understanding that these processes are not, per se, within the ambit of the invention.

It should also be appreciated that the initial oxide suspension may be either a suspension obtained directly by the action of a reagent on a precursor of the oxide under consideration, or a suspension obtained by dispersing, in water, a previously prepared powder of such oxide, optionally dried and calcined.

The aqueous suspensions of titanium oxide may be obtained, in particular, by the conventional process of the sulfuric acid decomposition of ilmenite following the hydrolysis and filtration stage.

They may also be prepared by the hydrolysis of titanium compounds of the formula $TiCl_{4-n}(OR)_n$, in which n ranges from 0 to 4 and R is an alkyl radical, preferably methyl, ethyl, isopropyl, butyl, hexyl or stearyl.

The precipitation processes are particularly applicable for preparing the zirconium oxide. In this case, such precipitation is by means of the addition of a basic compound, for example ammonia, to a solution of an acid precursor of zirconium, for example a zirconium nitrate, chloride or sulfate.

Calcination processes are also exemplary of the processes for the preparation of zirconium oxide, in particular the direct calcination of a precursor of the aforementioned type, for example in a flame.

Another process for the preparation of said oxide is by passing a precursor of the aforementioned type through a sol obtained by hot hydrolysis.

Ceric oxide may be prepared, in particular, by heating, in air at a temperature of from 400° to 1,000° C., ceric hydroxide or certain oxygen salts of cerium, such as the nitrates, sulfates, carbonates, oxalates, and acetates.

Other precipitation processes are also representative, such as those employing a hydrolysis of a cerium salt in an acid medium (FR 2,559,754) or a reaction between an aqueous solution of a cerium salt and a solution containing sulfate ions (FR 2,559,755).

Hydrophobic agent:

The process of the invention also utilizes a hydrophobic agent.

This hydrophobic agent may be an anionic, cationic or amphoteric hydrophobic agent.

The cationic or amphoteric agents suitable for the processes of the invention are advantageously selected from among the primary, secondary and tertiary amines or their salts, quaternary ammonium salts, amino acids or their salts.

As regards the amines, the light amines are the preferred. These are amines having at most 6 carbon atoms in their hydrocarbon chain. In particular, $C_4$–$C_6$ amines are used.

Preferably, the aliphatic amines are used.

Exemplary thereof are n-butylamine, cyclohexylamine and hexylamine.

Fatty acid amines too may be used. This expression designates amines, the substituents of which are carbon chains having a number of carbon atoms greater than 6 and more particularly greater than or equal to 10.

Exemplary of the tertiary amines, the dimethylalkyl fatty amines having the formula $RN(CH_3)_2$ are representative, wherein R is preferably a $C_8$–$C_{22}$ hydrocarbon radical, more preferably $C_8$–$C_{18}$, and, for example, a radical corresponding to the carbon chain of the following fatty acids: tallow, copra, oleic acid, whether or not hydrogenated.

In the same class, the dialkylmethyl fatty amines of the formula $R_2NCH_3$ are also exemplary, wherein R is defined as above.

Again in the same class are the trialkyl fatty amino acids of the formula $R_3N$ wherein R is as defined above.

The acetates are representative of the salts of the primary, secondary or tertiary amines.

Quaternary ammonium salts of the formula (1):

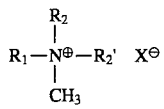
(1)

may also be used, wherein $R_1$ is an alkyl or alkenyl radical, preferbly having a number of carbon atoms equal to or greater than 6 and more particularly equal to or greater than 10, $R_2$ and $R_2'$ are alkyl, alkoxy or alkyl-phenyl radicals, which may be identical or different, and X is an anion.

Preferred salts thereof are the chlorides and sulfates.

Exemplary hydrophobic agents of this category suitable for use according to the invention are those in which $R_1$ is the copra radical, $R_2$ the benzyl radical, $R_2'$ the methyl radical, with the anion being the chloride, a product marketed under the trademark NORAMIUM DA 50, and that in which $R_1$ is the radical corresponding to the carbon chain of the fatty acid of tallow, $R_2$ and $R_2'$ are identical and represent methyl, a product marketed under the trademark NORAMIUM MS80.

It is also possible to use the diamines according to the invention.

Diamines of the formula $RNH$—$(CH_2)_3$—$NH_2$, in which R is defined as above, are exemplary.

Quaternary diammonium salts of the formula (2) may also be used:

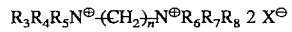
(2)

wherein $R_3$ is an alkyl or alkenyl radical having a number of carbon atoms equal to or greater than 8;

$R_4$, $R_5$, $R_6$, $R_7$ and $R_8$ are hydrogen or alkyl radicals;

$R_4$, $R_5$, $R_6$, and $R_7$ may be identical or different; n is a number ranging from 1 to 3; and X is an anion.

Exemplary of such compounds is that in which n=3, $R_4$=$R_5$=$R_6$=$R_7$=$R_8$=$CH_3$, X is a chloride, a product marketed under the trademark DUOQUAD.

Diamine salts of formula (3) may also be used:

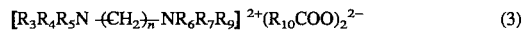
(3)

wherein $R_3$, $R_4$, $R_5$, $R_6$, $R_7$ and n are as defined above, $R_9$ is hydrogen or an alkyl radical, and $R_{10}$ is an alkyl radical having a number of carbon atoms equal to or greater than 8.

Exemplary thereof are the diamine dioleates.

Aminoacids of formula (4) or (5) are advantageously used:

wherein $R_{11}$ and $R_{12}$ are hydrogen or an alkyl radical, with the proviso that $R_{11}$ and $R_{12}$ cannot simultaneously be hydrogen.

In this case, lauryl betain ($R_{11}$=$C_{12}$=H), marketed under the trademark ARMOTERIC LB, is exemplary.

Other compounds suitable for use in the process of the invention are those of formula (6):

wherein $R_{13}$ is a $C_8$–$C_{22}$ alkyl radical, in particular $C_8$–$C_{18}$, for example corresponding to the carbon chain of tallow fatty acids, copra fatty acid, oleic acid, whether or not hydrogenated, or salts of the derivatives of formula (7):

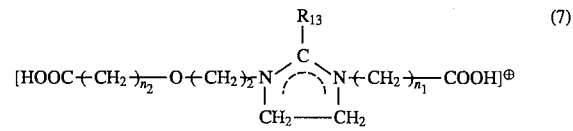

wherein $n_1$ and $n_2$ are identical or different integers ranging from 1 to 4.

Particularly representative are those materials marketed under the following trademarks:

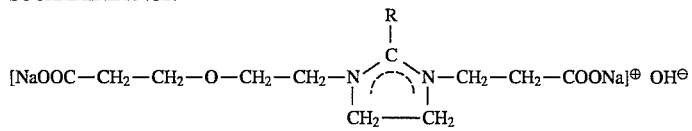

SOCHAMINE A 7527

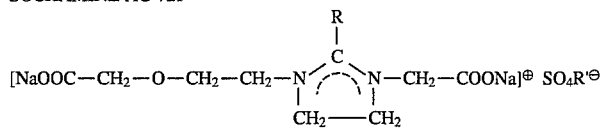

SOCHAMINE AC 721

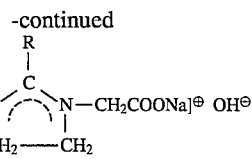

wherein R designates the copra radical and R' is a $C_{12}$–$C_{14}$ alkyl radical.

Finally, the pyridinium derivatives of the following formula (8) are exemplary:

$$R_{14}\text{—}C_5H_4NR_{15}^{\oplus}X^{\ominus} \qquad (8)$$

with X being a halogen, in particular chlorine, $R_{14}$ a radical corresponding to the carbon chain of a fatty acid, in particular a $CH_{16}$ radical, and $R_{15}$ is an alkyl radical, more particularly $CH_3$.

Exemplary of the anionic hydrophobic agents suitable for use according to the invention, the following are representative:

(i) alkali metal soaps, such as the sodium or potassium salts of saturated or unsaturated fatty acids having from 8 to 24 carbon atoms, or derivatives of aminocarboxylic acids, such as sodium N-laurylsarconisate, sodium N-acrylsarconisate;

(ii) alkaline sulfonates, such as the alkylsulfonates, arylsulfonates or alkylarylsulfonates, in particular alkylbenzenesulfonates of the formula $R_1$—$C_6H_4$—$SO_3$ $M_1$, in which the radical $R_1$ is a linear or branched chain alkyl radical containing 8 to 13 carbon atoms, such as, for example, a nonyl, dodecyl or tridecyl radical and $M_1$ is a sodium or potassium atom, an ammonium radical, diethanolamine or triethanolamine; alkylnaphthalenesulfonates, such as sodium nonylnaphthalenesulfonate. Other sulfonates may also be used, such as the N-acyl, N-alkyltaurates of the formula $R_2$—CO—$N(R'_2)$—$CH_2$—$CH_2$—$SO_3Na$, wherein $R_2$ is an alkyl radical having 11 to 18 carbon atoms and $R'_2$ is a methyl or ethyl radical, for example sodium N-oleoyl, N-methyltaurate or sodium N-palmitol or N-methyltaurate;

(iii) the beta-sulfoethyl esters of fatty acids, for example lauric, myristic, stearic acids; olefinsulfonates containing 12 to 24 carbon atoms, obtained by the sulfonation by means of sulfuric trioxide of an alpha-olefin, such as 1-dodecene, 1-tetradecene, 1-hexadecene, 1-octadecene, 1-eicosene, 1-tetracosene;

(iv) sulfates and sulfated compounds: among the alkyl sulfates of the formula $R_3OSO_3$ $M_1$, exemplary are those in which the $R_3$ radical is a lauryl, cetyl or myristyl radical and $M_1$ is as defined above; naturally sulfated oils and fatty acids; the disodium salt of sulfated oleic acid; sulfated polyoxyethylene fatty alcohols of the formula $R_4$—(O—$CH_2$—$CH_2$)$_{n1}$—$OSO_3$ $M_1$, in which the $R_4$ radical is an alkyl radical containing 6 to 16 carbon atoms, such as for example a myristyl radical or a linear or branched chain alkyl radical, such as for example a hexyl, octyl, decyl or dodecyl radical, $n_1$ is the number of the ethylene oxide recurring units and ranges from 1 to 4 and $M_1$ is as defined above; polyoxyethylene alkylphenol sulfates of the formula $R_5$—$C_6H_4$-(O—$CH_2$)$_{n2}$—$OSO_3$ $M_1$, wherein the radical $R_5$ is a linear or branched chain alkyl radical containing 8 to 13 carbon atoms, such as for example an octyl, nonyl or dodecyl radical, $n_2$ is the number of ethylene oxide recurring units and ranges from 1 to 6 and $M_1$ is as defined above;

(iv) primary or secondary esters of orthophosphoric acid or one of its salts, which may be represented relative to alkyl phosphates by the formula $(R_6O)PO(OM_2)_2$ and relative to dialkyl phosphates by the formula $(R_6O)_2PO(OM_2)$, in which the $R_6$ radical is a linear or branched chain alkyl radical containing from 6 to 12 carbon atoms and $M_2$ is a hydrogen atom, sodium or potassium. Exemplary of the radical $R_6$ are n-hexyl, n-octyl, n-ethylhexyl, dimethylhexyl, n-decyl, dimethyloctyl, trimethylheptyl and trimethylnonyl;

(v) mono- or diesters of orthophosphoric acid or one of the salts thereof, for example the polyoxyethylene alkyl phosphates having the formula:

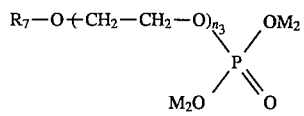

and the polyoxyethylene dialkyl phosphates having the formula:

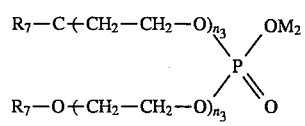

in which the $R_7$ radical is a linear or branched chain alkyl radical having 6 to 12 carbon atoms, a phenyl radical, an alkylphenyl radical with an alkyl chain containing 8 to 12 carbon atoms, $n_3$ is the number of ethylene oxide recurring units and ranges from 2 to 8 nd $M_2$ is as defined above. Exemplary of the $R_7$ radical are hexyl, octyl, decyl, dodecyl and nonylphenyl.

Solvent:

Finally, the process of the invention employs an organic solvent that is immiscible with water or is but slightly miscible with water. It is apparent that the solvent must be compatible with the hydrophobic agent employed.

This solvent is advantageously an ester, ether or ketone, preferably aliphatic in nature.

Particularly representative of the aliphatic esters are the formates, acetates, propionates, butyrates, oxalates, phosphates and lactates.

The acetates, in particular the ethyl, isopropyl and butyl acetates, are preferred.

Among the ethers, diisopropyl ether is the preferred.

The aliphatic ketones are advantageously used in the process of the invention. Preferred are methylisobutyl ketone and ethylisopropyl ketone.

Other types of solvents that may be used are aromatic solvents or benzene hydrocarbons.

In particular, xylene and toluene may be used. Halogen and specifically the chlorine derivatives of such solvents may also be used, for example chlorobenzene.

Another suitable type of a solvent is that of the halogenated aliphatic or alicyclic hydrocarbon category.

Short chain $C_1$–$C_4$ halogenated aliphatic or alicyclic hydrocarbons are exemplary. Representative are the materials marketed under the trademark FLUGENE.

Specifically, trichlorotrifluoroethane and dichlorotetrafluoroethane are representative.

The halogenated ethylenes are also representative solvents.

Exemplary are dichloroethylene, trichloroethylene and tetrachloroethylene.

All of the solvents mentioned above may be used either alone or in combination.

The amount of hydrophobic agent used varies as a function of the type of oxide present in the initial suspension or sol and its BET surface. This amount increases with larger surfaces. Generally, it ranges from 0.1% to 100%, more particularly from 0.5% to 40% by weight relative to the weight of the oxide, expressed as the dry solids content thereof, i.e., relative to the amount of the oxide in the suspension or the sol.

However, in the case of the water miscible light amines, such amounts may possibly be greater than those mentioned above.

The maximum amount of the hydrophobic agent is not critical in and of itself. For example, in actual practice it may be a maximum 200%.

The amount of the solvent is again a function of the type of the oxide, as described above for the hydrophobic agent. This amount generally is such that the ratio of the volume of the solvent, expressed as liter/weight of the oxide in kg (always calculated relative to the oxide present in the suspension or sol), ranges from 0.1 to 5, preferably from 0.2 to 1.5.

In fact, the amounts of the solvent and the hydrophobic agent are interrelated and also depend on the nature of the hydrophobic agent. For a given amount of the hydrophobic agent, there is a minimum amount of the solvent beyond which there is no agglomeration of the oxide. There is also a maximum amount, beyond which the granule adhere to each other and a compact mass of the oxide results.

Generally, these minimum and maximum amounts are within the range of values indicated above.

The suspension or sol, the hydrophobic agent and the solvent may be combined in different manners.

In a first embodiment, the suspension or sol of the oxide is first mixed with the solvent and the hydrophobic agent is then introduced into the mixture thus obtained.

In a second embodiment, the oxide suspension and the hydrophobic agent are first mixed together, and the solvent is then added to the mixture thus produced.

In a preferred third embodiment, in the case of hydrophobic agents which are only slightly soluble in water, for example the fatty amines, the solvent and the hydrophobic agent may first be mixed and the mixture then contacted with the oxide suspension or sol.

The mixing of the suspension or sol, the hydrophobic agent and the solvent is carried out under agitation. Any type of agitation may be used, particularly a turbine type agitator.

The grain size distribution of the products produced generally varies as a function of the severity of the agitation. The greater the power of the agitation, the finer the grain size distribution.

The temperature at which the mixture is prepared is not critical, in principle. It varies generally between ambient temperature and 80° C.

However, concerning the temperature parameter, the water-miscible light amines represent a special case. It has been observed that such temperature must increase with decreasing numbers of carbon atoms in the chain of the amine used.

For amines with $C_4$ or less, this temperature will generally be at least 50° C. and more particularly at least 80° C.

For the $C_5$–$C_6$ amines, this temperature is also a function of the solvent and their solubility in water. Generally, this temperature increases with increasing solubilities.

Finally, it is noted that the use of a hydrophobic agent of the cationic or anionic type depends among other variables on the pH of the initial suspension or sol. Preferably, for a cationic hydrophobic agent, the conditions should be such that the pH of the mixture of the suspension or sol, the hydrophobic agent and the solvent, at the moment of granulation, be higher than the pH corresponding to the isoelectric point of the oxide of the suspension or the sol. In contrast, for an anionic hydrophobic agent, the pH, as defined above, should be less than the pH corresponding to the isoelectric point.

Once the agitation of the reaction medium is completed, granules of the mineral oxide and a liquid phase, which typically is an aqueous phase, are produced.

A second stage entails separating the resulting granules and the liquid phase. This separation may be carried out by any known means, for example by band filtration or centrifugation.

The separation is easily accomplished; this is one of the advantages of the present invention.

The granules obtained in this manner may be washed, if necessary. Water or water saturated with the solvent may be used for the washing step.

In addition to washing, the granules of the invention may optionally be dried and/or, if necessary, calcined. Drying and calcining may be carried out by any known means.

The invention also features the final product granules that are produced by the process described above.

As indicated above, the particulates according to the invention are characterized essentially by their structure. They are preferably in the form of essentially spherical granules. These granules are also porous. The final product of the invention thus has a specific volume of at least 0.1 cm$^3$/g, preferably at least 0.3 cm$^3$/g and even more preferably from 0.5 to 2 cm$^3$/g.

The specific volumes are determined by ASTM standard D4284-83. The porosities given are intragranular porosities.

The grain size distribution may vary over wide limits.

The granules thus may have a mean particle size of at least 50 microns, in particular at least 200 microns.

In a preferred embodiment of the invention, granules having a mean particle size of at least 0.5 mm, preferably from 0.5 to 2 mm and more preferably from 0.5 to 20 mm, are produced.

The granules of the invention may also contain a certain amount of a hydrophobic agent, for example from 0.1% to 30% by weight, which may be useful for certain applications.

The granules obtained in this manner are suitable for all known applications of the oxides. For example, they may be used as fillers, binders, absorbants, catalysts, catalyst supports, and the like.

In order to further illustrate the present invention and the advantages thereof, the following specific examples are given, it being understood that same are intended only as illustrative and in nowise limitative.

EXAMPLE 1

A medium containing 700 g permutated water and, in suspension, 100 g $TiO_2$ AT 1ND marketed by the Thann et Mulhouse Co., was agitated in a 1 liter reactor equipped with 4 counter-rotating blades, by a Rushton turbine having a 50 mm diameter, rotating at 800 rpm.

The pH of the suspension was 7.3.

To this medium, over 10 min, 24 g of a 95/5 by weight mixture of cyclohexane and hexylamine were added.

After 30 min of agitation, the resulting medium was filtered on a Buchner filter and dried in an oven, under nitrogen, for 12 h at 100° C.

The $TiO_2$ final product was produced in a granulated form, having a mean grain size of 340 micron and an apparent packed density of 0.96.

EXAMPLE 2

A medium containing 700 g permutated water and, in suspension, 100 g of $TiO_2$ AT 1ND was agitated as in Example 1.

The pH of the medium was 7.3.

Into this medium, gradually over 10 min, 40 g of a mixture of methylisobutylketone and then, also gradually over 10 min, 24 g of an aqueous solution (50% dry solids content) of NORAMIUM DA 50 were introduced.

After 30 min of agitation, the medium was filtered on a Buchner filter and dried in an oven under nitrogen for 12 h at 100° C.

The $TiO_2$ product was obtained in granular form having a mean grain size of 340 micron and an apparent packed density of 0.96.

EXAMPLE 3

770 g of a $ZrO_2$ sol, 9% oxide and 91% water, produced by $ZrOCl_2$ hydrolysis and having a mean grain size of 0.25 microns, was agitated as in the previous examples.

The pH of the medium was 7.9.

Into this medium, 41 g of a 50/50 by weight mixture of cyclohexane and n-heptylamine were introduced, over 10 min.

After 30 min of agitation, the medium was filtered on a Buchner filter and the solids dried in an oven, under nitrogen, for 12 h at 100° C.

The $ZrO_2$ product was obtained in granular form having a mean grain size of 550 micron and an apparent packed density of 0.93.

EXAMPLE 4

The sol of Example 3 was used, under the same operating conditions.

The pH of the sol was adjusted to 12 by the addition of a 10% solution of sodium hydroxide in water.

Rapidly, 54 g MIBK (methylisobutylketone) were introduced into this medium.

Progressively, over 10 min, 14 g of a Noramium DA solution in permutated water (10% dry solids content) were added.

After 30 min of agitation, the medium was filtered on a Buchner filter and dried in an oven, under nitrogen, for h at 100° C.

The $ZrO_2$ product was obtained in granular form, having a mean grain size of 550 micron and an apparent packed density of 0.91.

EXAMPLE 5

The sol of Example 3 was used, under the same operating conditions.

The pH of the sol was 7.9.

Rapidly, 54 g methylisobutylketone were introduced into this medium.

Progressively, over 10 min, 14 g of a JANSSEN sodium dodecylsulfate solution, ref. 23 042.53, having a 10% dry solids content in permutated water, were introduced.

After 30 min of agitation, the medium was filtered on a Buchner filter and dried in an oven, under nitrogen, for 12 h at 100° C.

The $ZrO_2$ product was obtained in granular form, having a mean grain size of 550 micron and an apparent packed density of 0.93.

EXAMPLE 6

A medium containing 700 g water and 70 g 99.5% $CeO_2$ in powder form (marketed by the A.M.P.E.R.E Co.) was agitated as in the previous examples.

The pH of the suspension was 6.5.

Progressively, into this medium, over 10 min, 19 g of 50/50 by weight of a mixture of cyclohexane and n-hexylamine were introduced.

After 30 min of agitation, the medium was filtered on a Buchner filter and dried in an oven, under nitrogen, for 12 h at 100° C.

The $CeO_2$ product was obtained in granular form, having a mean grain size of 300 micron and an apparent packed density of 1.05.

EXAMPLE 7

The starting material of Example 6 was used under the same operating conditions.

The pH of the suspension was adjusted to 12 by the addition of a 10% sodium hydroxide solution in water.

To this medium, 19 g methylisobutylketone were rapidly added.

Progressively, over 10 min, 7 g of NORAMIUM DA 50 in permutated water (10% dry solids content) were added.

After 30 min agitation, followed by filtration and drying as in Example 6, granules having a mean grain size and density identical to those of Example 6 were obtained.

EXAMPLE 8

The starting material and the operating conditions of Example 6 were used.

The pH of the suspension was 6.5.

19 g methylisobutylketone were rapidly introduced into this medium.

Progressively, over 10 min, 7 g of JANSSEN sodium dodecylsulfate, ref. 23 042 53, having a 10% dry solids content, in permutated water were introduced.

After 30 min agitation, followed by filtration and drying as in Example 6, granules having a mean grain size and density the same as those of the granules of Example 6, were obtained.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of agglomerates of titanium oxide, zirconium oxide or cerium oxide, comprising the steps of:
   (a) intimately admixing under agitation an aqueous suspension or sol of titanium oxide, zirconium oxide or cerium oxide, at least one hydrophobic agent comprising a cationic hydrophobic agent, amphoteric hydrophobic agent, or anionic hydrophobic agent, and at least one organic solvent which is immiscible or only slightly miscible with water in an amount sufficient to effectively agglomerate said titanium oxide, zirconium oxide or cerium oxide and less than an amount which causes the resulting oxide agglomerates to adhere to one another in a compact mass, said at least one organic solvent comprising an ester, ether or ketone;
   (b) maintaining the agitation of said admixture until a medium is obtained consisting essentially of agglomerates of titanium oxide, zirconium oxide or cerium oxide, and an aqueous liquid phase, said aqueous liquid phase being essentially devoid of titanium oxide, zirconium oxide or cerium oxide; and
   (c) separating said aqueous liquid phase from said agglomerates of titanium oxide, zirconium oxide or cerium oxide.

2. The process as defined by claim 1, said at least one hydrophobic agent comprising a cationic hydrophobic agent or amphoteric hydrophobic agent.

3. The process as defined by claim 1, said at least one hydrophobic agent comprising a primary, secondary or tertiary amine or salt thereof, a quaternary ammonium salt, or an aminoacid or salt thereof.

4. The process as defined by claim 3, said at least one hydrophobic agent comprising an amine having up to 6 carbon atoms.

5. The process as defined by claim 4, said at least one hydrophobic agent comprising an aliphatic amine.

6. The process as defined by claim 3, said at least one hydrophobic agent comprising a fatty amine.

7. The process as defined by claim 3, said at least one hydrophobic agent comprising an acetate salt of a primary, secondary or tertiary amine.

8. The process as defined by claim 3, said at least one hydrophobic agent comprising a diamine.

9. The process as defined by claim 8, said diamine having the formula $RNH-(CH_2)_3-NH_2$, wherein R is a $C_8-C_{22}$ hydrocarbon radical.

10. The process as defined by claim 3, said at least one hydrophobic agent comprising a quaternary ammonium salt having the formula:

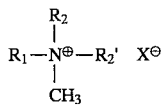

wherein $R_1$ is an alkyl or alkenyl radical, $R_2$ and $R_2'$, which may be identical or different, are each an alkyl, alkoxy or alkylphenyl radical, and X is an anion.

11. The process as defined by claim 3, said at least one hydrophobic agent comprising a quaternary diammonium salt having the formula:

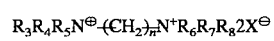

wherein $R_3$ is an alkyl or alkenyl radical having at least 8 carbon atoms, $R_4$, $R_5$, $R_6$, $R_7$ and $R_8$ are each hydrogen or an alkyl radical, with the proviso that $R_4$, $R_5$, $R_6$ and $R_7$ may either be identical or different, n is a number ranging from 1 to 3, and X is an anion.

12. The process as defined by claim 3, said at least one hydrophobic agent comprising a diamine salt having the formula:

wherein $R_3$ is an alkyl or alkenyl radical having at least 8 carbon atoms, $R_4$, $R_5$, $R_6$, $R_7$ and $R_9$ are each hydrogen or an alkyl radical, $R_{10}$ is an alkyl radical having at least 8 carbon atoms, and n is a number ranging from 1 to 3.

13. The process as defined by claim 3, said at least one hydrophobic agent comprising an aminoacid having one of the formulae:

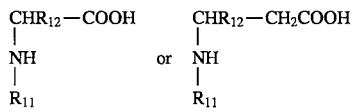

wherein $R_{11}$ and $R_{12}$ are each hydrogen or an alkyl radical, with the proviso that $R_{11}$ and $R_{12}$ cannot simultaneously be hydrogen, or salt thereof.

14. The process as defined by claim 3, said at least one hydrophobic agent comprising a compound having the formula:

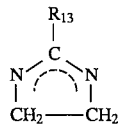

wherein $R_{13}$ is a $C_8-C_{22}$ alkyl radical.

15. The process as defined by claim 3, said at least one hydrophobic agent comprising a compound having the formula:

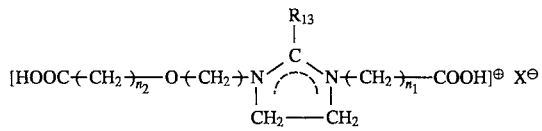

wherein $R_{13}$ is a $C_8-C_{22}$ alkyl radical, $n_2$ and $n_1$ are each numbers ranging from 1 to 4, and X is an anion.

16. The process as defined by claim 3, said at least one hydrophobic agent comprising a compound having the formula:

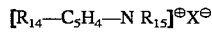

wherein $R_{14}$ is a fatty hydrocarbon, $R_{15}$ is an alkyl radical, and X is a halide.

17. The process as defined by claim 1, said at least one hydrophobic agent comprising an anionic hydrophobic agent.

18. The process as defined by claim 17, said at least one hydrophobic agent comprising an alkali metal soap, an alkaline sulfonate, a beta-sulfoethyl ester of a fatty acid, a sulfate or sulfated compound, or an ester of orthophosphoric acid or salt thereof.

19. The process as defined by claim 1, said at least one organic solvent comprising an acetic ester.

20. The process as defined by claim 1, wherein the amount of said at least one hydrophobic agent ranges from 0.1% to 100% by weight of the titanium, zirconium or cerium oxide, based on the dry solids content thereof.

21. The process as defined by claim 1, said intimate admixing being carried out at a temperature of at least 50° C.

22. The process as defined by claim 20, wherein the amount of said at least one organic solvent is such that the volume ratio of said solvent, expressed in liter/weight of the oxide, in kg, ranges from 0.1 to 5.

23. The process as defined by claim 1, said intimate admixing comprising first mixing the suspension or sol of the oxide with the at least one organic solvent, and then adding said at least one hydrophobic agent to the resulting mixture.

24. The process as defined by claim 1, said intimate admixing comprising first mixing the suspension or sol of the oxide with the at least one hydrophobic agent, and then adding said at least one organic solvent to the resulting mixture.

25. The process as defined by claim 1, said intimate admixing comprising first mixing said at least one organic solvent with said at least one hydrophobic agent, and then contacting the resulting mixture with the suspension or sol of the oxide.

26. The process as defined by claim 1, further comprising washing said separated agglomerates of titanium oxide, zirconium oxide or cerium oxide.

27. The process of claim 1 further comprising (c) washing, drying and calcining said agglomerates of titanium oxide, zirconium oxide or cerium oxide.

28. A process for the preparation of agglomerates of titanium oxide, zirconium oxide or cerium oxide, comprising the steps of:

(a) intimately admixing under agitation an aqueous suspension or sol of titanium oxide, zirconium oxide or cerium oxide, at least one hydrophobic agent comprising a cationic hydrophobic agent, amphoteric hydrophobic agent, or anionic hydrophobic agent, and at least one organic solvent which is immiscible or only slightly miscible with water in an amount sufficient to effectively agglomerate said titanium oxide, zirconium oxide or cerium oxide and less than an amount which causes the resulting oxide agglomerates to adhere to one another in a compact mass, said at least one organic solvent comprising toluene or xylene;

(b) maintaining the agitation of said admixture until a medium is obtained consisting essentially of agglomerates of titanium oxide, zirconium oxide or cerium oxide, and an aqueous liquid phase, said aqueous liquid phase being essentially devoid of titanium oxide, zirconium oxide or cerium oxide; and (c) separating said aqueous liquid phase from said agglomerates of titanium oxide, zirconium oxide or cerium oxide.

29. A process for the preparation of agglomerates of titanium oxide, zirconium oxide or cerium oxide, comprising the steps of:

(a) intimately admixing under agitation an aqueous suspension or sol of titanium oxide, zirconium oxide or cerium oxide, at least one hydrophobic agent comprising a cationic hydrophobic agent, amphoteric hydrophobic agent, or anionic hydrophobic agent, and at least one organic solvent which is immiscible or only slightly miscible with water in an amount sufficient to effectively agglomerate said titanium oxide, zirconium oxide or cerium oxide and less than an amount which causes the resulting oxide agglomerates to adhere to one another in a compact mass, said at least one organic solvent comprising a halogenated aliphatic hydrocarbon or a halogenated alicyclic hydrocarbon;

(b) maintaining the agitation of said admixture until a medium is obtained consisting essentially of agglomerates of titanium oxide, zirconium oxide or cerium oxide, and an aqueous liquid phase, said aqueous liquid phase being essentially devoid of titanium oxide, zirconium oxide or cerium oxide; and (c) separating said aqueous liquid phase from said agglomerates of titanium oxide, zirconium oxide or cerium oxide.

30. The process as defined by claim 29, said halogenated hydrocarbon comprising a haloethylene compound.

31. The process as defined by claim 29, said halogenated hydrocarbon having from 1 to 4 carbon atoms.

32. The process as defined by claim 30, said haloethylene compound comprising dichloroethylene, trichloroethylene or tetrachloroethylene.

* * * * *